(12) United States Patent
Trelin

(10) Patent No.: US 11,594,087 B2
(45) Date of Patent: *Feb. 28, 2023

(54) BIOMETRIC EXIT WITH AN ASSET

(71) Applicant: Alclear, LLC, New York, NY (US)

(72) Inventor: Joe Trelin, New York, NY (US)

(73) Assignee: ALCLEAR, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/682,320

(22) Filed: Feb. 28, 2022

(65) Prior Publication Data

US 2022/0237969 A1     Jul. 28, 2022

Related U.S. Application Data

(63) Continuation of application No. 16/398,796, filed on Apr. 30, 2019, now Pat. No. 11,295,566.

(60) Provisional application No. 62/665,054, filed on May 1, 2018.

(51) Int. Cl.
| | |
|---|---|
| *G07C 9/00* | (2020.01) |
| *G06Q 20/40* | (2012.01) |
| *G06Q 30/06* | (2012.01) |
| *G06Q 30/0645* | (2023.01) |
| *G06Q 30/0601* | (2023.01) |
| *G06V 40/16* | (2022.01) |

(Continued)

(52) U.S. Cl.
CPC ... *G07C 9/00563* (2013.01); *G06Q 20/40145* (2013.01); *G06Q 30/0635* (2013.01); *G06Q 30/0645* (2013.01); *G06V 40/1365* (2022.01); *G06V 40/172* (2022.01); *G06V 40/197* (2022.01)

(58) Field of Classification Search
CPC ......... G06Q 20/40145; G06Q 30/0635; G06Q 30/0645; G07C 9/00563; G06K 9/00087; G06K 9/00288; G06K 9/00617
See application file for complete search history.

(56) References Cited

U.S. PATENT DOCUMENTS

| | | |
|---|---|---|
| 8,381,969 B1 | 2/2013 | Miller et al. |
| 8,423,462 B1 | 4/2013 | Amacker et al. |
| 8,521,131 B1 | 8/2013 | Ramalingam et al. |

(Continued)

OTHER PUBLICATIONS

Vacation Rental Property Management Software Brings Automation and Efficiencies to the Competitive Industry M2 Presswire Apr. 30, 2018: NA. Retrieved via ProQuest (Year: 2018).*

(Continued)

*Primary Examiner* — Michael Misiaszek
(74) *Attorney, Agent, or Firm* — Brownstein Hyatt Farber Schreck, LLP

(57) ABSTRACT

A biometric exit system controls exit of a person from an area with an asset. The system obtains a digital representation of a biometric for the person. The system receives an identification of the person using the digital representation of the biometric. Using the identification, the system receives permissions regarding whether or not the person may exit the area with the asset. If the person is permitted, the system allows the person to exit. Upon allowing exit, the system may transmit a message to the person. The message may include a confirmation of a transaction and/or one or more offers to which the person can respond.

20 Claims, 9 Drawing Sheets

(51) Int. Cl.
*G06V 40/18* (2022.01)
*G06V 40/12* (2022.01)

(56) References Cited

U.S. PATENT DOCUMENTS

| | | | |
|---|---|---|---|
| 8,657,190 | B2 | 2/2014 | Lais et al. |
| 8,744,966 | B1 | 6/2014 | Amacker et al. |
| 8,965,170 | B1 | 2/2015 | Benea |
| 9,107,064 | B1 | 8/2015 | Ramalingam et al. |
| 9,166,961 | B1 | 10/2015 | Johansson et al. |
| 9,202,105 | B1 | 12/2015 | Wang et al. |
| 9,324,098 | B1 | 4/2016 | Agrawal et al. |
| 9,386,507 | B1 | 7/2016 | Ramalingam et al. |
| 9,607,138 | B1 | 3/2017 | Baldwin et al. |
| 9,609,577 | B1 | 3/2017 | Ramalingam et al. |
| 9,681,350 | B1 | 6/2017 | Marupaduga et al. |
| 9,681,359 | B2 | 6/2017 | Ramalingam et al. |
| 9,723,131 | B1 | 8/2017 | Ramalingam et al. |
| 9,836,642 | B1 | 12/2017 | Ramaswamy |
| 9,934,504 | B2 | 4/2018 | Wang et al. |
| 9,967,250 | B2 | 5/2018 | Johansson et al. |
| 10,027,662 | B1 | 7/2018 | Mutagi et al. |
| 10,055,740 | B2 | 8/2018 | Hanson et al. |
| 10,104,181 | B1 | 10/2018 | Rao et al. |
| 10,108,791 | B1 | 10/2018 | Masterman |
| 10,108,961 | B2 | 10/2018 | Wang et al. |
| 10,122,727 | B2 | 11/2018 | Johansson et al. |
| 10,235,669 | B2 | 3/2019 | Amacker et al. |
| 10,242,364 | B2 | 3/2019 | Wang et al. |
| 10,243,945 | B1 | 3/2019 | Kruse et al. |
| 11,151,481 | B1 | 10/2021 | Sun et al. |
| 2004/0221303 | A1 | 11/2004 | Sie |
| 2008/0249856 | A1 | 10/2008 | Angell et al. |
| 2012/0089426 | A1 | 4/2012 | Borucki et al. |
| 2013/0008958 | A1* | 1/2013 | Smith ................ G07C 9/00904 235/382 |
| 2013/0317693 | A1 | 11/2013 | Jefferies et al. |
| 2014/0189720 | A1 | 7/2014 | Terrazas |
| 2015/0186988 | A1 | 7/2015 | Skinner et al. |
| 2015/0294515 | A1 | 10/2015 | Bergdale |
| 2016/0189063 | A1 | 6/2016 | Nie |
| 2017/0188103 | A1 | 6/2017 | Pan |
| 2017/0270490 | A1 | 9/2017 | Penilla et al. |
| 2018/0007060 | A1 | 1/2018 | Leblang et al. |
| 2018/0047007 | A1 | 2/2018 | High et al. |
| 2018/0216946 | A1 | 8/2018 | Gueye et al. |
| 2018/0232796 | A1* | 8/2018 | Glaser .................. G06Q 40/12 |
| 2019/0028470 | A1 | 1/2019 | Marthinussen et al. |
| 2019/0036939 | A1 | 1/2019 | Johansson et al. |
| 2019/0050631 | A1 | 2/2019 | Hayase |
| 2020/0275267 | A1 | 8/2020 | Wang et al. |

OTHER PUBLICATIONS

Birch, Ray, "Will Biometric Payments Ever Make Cards Obsolete?" Credit Union Journal, New York, vol. 18, Issue. 4, Jan. 27, 2014.
Maras, "Fledgling tech company ready to take on Amazon Go," Mobile Payments Today, News Features, Apr. 14, 2017.
McCarthy, Ellen, "Cash, Charge or Fingerprint?; Retailers Experiment With Biometric Payment To Speed Up Service And Prevent Fraud, A Move That Worries Some Privacy Advocates," The Washington Post, Washington, D.C. Jun. 2005.

* cited by examiner

BIOMETRIC EXIT WITH AN ASSET

CROSS-REFERENCE TO RELATED APPLICATION(S)

This application is a continuation patent application of U.S. patent application Ser. No. 16/398,796, filed Apr. 30, 2019 and titled "Biometric Exit with an Asset," which is a nonprovisional patent application of and claims the benefit of U.S. Provisional Patent Application No. 62/665,054, filed May 1, 2018 and titled "Biometric Exit with an Asset," the disclosures of which are hereby incorporated herein by reference in their entireties.

FIELD

The described embodiments relate generally to control of people taking assets from a controlled area. More particularly, the present embodiments relate to using biometrics to determine whether or not to allow people to remove assets from controlled areas.

BACKGROUND

Entities may have assets (such as automobiles, electronics items, clothing, food, and so on) that they wish to allow people to access, purchase, rent, or otherwise use. The entities may wish to restrict how people behave with those assets. To accomplish this, the entities may maintain the assets in a controlled asset area. The entities may restrict entry to the controlled asset area, exit from the controlled asset area, how people behave while in the controlled asset area, and so on.

For example, automobile rental agencies may maintain a lot of automobiles that people may rent. Renters may interact with an agent in order to be identified and obtain a rented automobile.

By way of another example, electronics retailers may maintain a store where various electronics items are available for purchase by people. People buying the electronics items may select one or more items, take the items to a register, and pay before being allowed to leave with the item.

SUMMARY

The present disclosure relates to biometric-controlled exit from an area with an asset. A biometric exit system controls a person's exit from the area with the asset. The system obtains a digital representation of a biometric for the person. The system receives an identification of the person using the digital representation of the biometric. Using the identification, the system obtains permissions regarding whether or not the person is permitted to exit the area with the asset. If the person is permitted, the system allows the person to exit. Upon allowing exit, the system may transmit a message to the person. The message may include a confirmation of a transaction and/or one or more offers to which the person can respond.

In various embodiments, a biometric exit system includes a biometric reader device, a non-transitory storage medium that stores instructions, and a processing unit. The processing unit executes the instructions to transmit a digital representation of a biometric for a person at an exit with an asset; receive an identification for the person; receive permissions for the person using the identification; and, when the permissions indicate the person is permitted, allow the person to exit with the asset.

In some examples, the biometric reader device is a camera. In various examples, the digital representation of the biometric is an image of at least a portion of a face of the person. In a number of examples, the digital representation of the biometric is an image of at least an iris of the person. In various examples, the digital representation of the biometric is a digital representation of a fingerprint of the person. In a number of examples, the permissions are a rental contract associated with the asset.

In some embodiments, a biometric exit system includes a biometric reader device, an exit control mechanism, a non-transitory storage medium that stores instructions, and a processing unit. The processing unit executes the instructions to receive a biometric exit system identifier for a person from an identification system in response to transmitting a digital representation of a biometric for the person; receive permissions for the person with respect to an asset in an asset control area using the biometric exit system identifier; and, when the permissions indicate the person is authorized, signal the exit control mechanism to allow the person to exit with the asset.

In various examples, the biometric exit system identifier is an automobile rental account number. In some examples, the processing unit processes payment for the asset. In a number of examples, the asset is merchandise at a store. In various examples, the processing unit processes a payment for the asset by communicating with a payment system. In some examples, the processing unit identifies the asset. In a number of examples, the processing unit signals the exit control mechanism to prevent the person from exiting with the asset when the permissions indicate the person is unauthorized. In various examples, the exit control mechanism is a gate and the processing unit signals the exit control mechanism to allow the person to exit with the asset by opening the gate.

In a number of embodiments, a biometric exit system includes a biometric reader device, a non-transitory storage medium that stores instructions, and a processing unit. The processing unit executes the instructions to obtain an identification for a person at an exit with an asset using a digital representation of a biometric; identify the asset; when the person has permission to exit with the asset, allow the person to exit; and transmit a message that includes at least one offer.

In various examples, the processing unit is operable to process the at least one offer using a response to the message. In some examples, the processing unit is operable to process the at least one offer if a response to the message is received within a period of time. In a number of examples, the at least one offer includes a purchase offer related to the asset. In some examples, the asset is a rental automobile. In various examples, the at least one offer is an offer to prepay gas for a rental automobile.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1A:
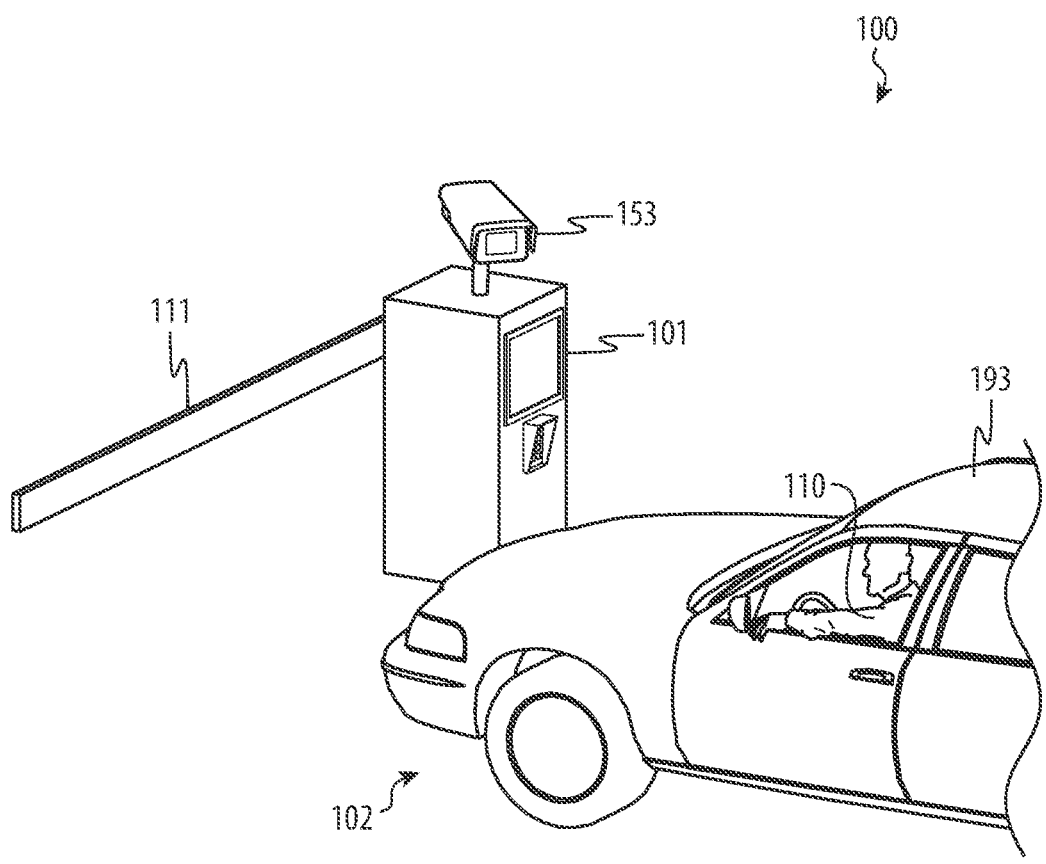
FIG. 1A depicts an example of a system that uses biometrics to control exiting with an asset from an area.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, apparatuses, methods, and computer program products that embody various elements of the present disclosure. However, it should be understood that the described disclosure may be practiced in a variety of forms in addition to those described herein.

Many situations involve people attempting to take assets from controlled areas. For example, automobile rental agencies may maintain a lot where automobiles are stored until they are picked up by people renting them. Typically, people renting automobiles may interact with an agent who identifies the person and verifies that the person has rented the automobile they wish to exit the lot with. However, this process may be burdensome, time-consuming, inefficient, and inconvenient. If a number of people are attempting to leave with rented automobiles at the same time, the time for this process may become lengthy.

This situation is similar to other scenarios where people may attempt to take other assets from other controlled areas. For example, retailers may maintain a store where various items may be stored until they are purchased or picked up in person. Typically, people buying an item may select it, take it to a register, and pay for it before being allowed to leave with the item. Again, if a number of people are attempting to purchase items at the same time, the transaction time may become lengthy or delayed. This may result in a burdensome, time-consuming, inefficient, and inconvenient process.

The following disclosure relates to biometric exit with an asset. A biometric exit system may obtain one or more biometrics from a person with one or more assets at an exit. The system may obtain an identification of the person using a digital representation of the biometric and permissions regarding whether or not the person may exit with the asset. If so, the system may allow the person to exit with the asset.

In some implementations, the system may transmit a message to the person after allowing the person to exit with the asset. The message may be a confirmation of a transaction relating to the exit, such as a confirmation of a rental contract or purchase receipt. The message may also include one or more offers related to the asset and/or exit. The person may be able to respond to the message in order to accept and/or otherwise interact with the offer.

In various implementations, the system may transmit a digital representation of the biometric to a system operated by an identification and/or authorization ("IA") service. For example, the system may capture a digital representation of a biometric for a person (which may be any biological data related to a person that may be used to identify the person, such as one or more fingerprints, palm prints, gaits, iris scans, retina scans, voiceprints, gestures, and/or any other kind of biological information about a person), generate a hash or other digital representation of the biometric, and transmit the digital representation of the biometric to the IA service. The IA service may store digital representations of biometrics for people and biographic and/or other information for those people. The IA service may receive the digital representation of the biometric, compare the digital representation of the biometric to the stored digital representations of biometrics to identify the person, and return biographic or other information using the identification.

For example, the biometric exit system may associate the person with an account number or other identifier, such as by associating a digital representation of a biometric for the person with the account number or other identifier. The IA service may include the account number in the biographic or other information stored about the person and associated with digital representations of a biometric for the person. Upon matching the digital representation of the biometric to one of the stored digital representations of biometrics, the IA service may return the account number associated with the match. In this way, the biometric exit system can biometrically identify the person without having full access to all of the information stored by the IA service and without providing the IA service access to all information stored by the biometric exit system.

These and other embodiments are discussed below with reference to FIGS. 1A-7. However, those skilled in the art will readily appreciate that the detailed description given herein with respect to these Figures is for explanatory purposes only and should not be construed as limiting.

In various implementations, a system may use biometrics to control exiting with an asset from an area. Assets may be located in the area. A person may attempt to exit the area with one or more of the assets. When the person attempts to exit the area, the system may obtain a digital representation of a biometric for the person. Using the biometric, the system may identify the person. Based on the identification, the system may determine whether the person has permission to exit the area with the asset. The system may determine whether or not the person has permission by retrieving permissions from a database where permissions are stored. If so, the system may allow exit. Otherwise, the system may prevent the person from exiting the area with the asset. In this way, the system may expedite the person's exit of the area with the asset.

In some implementations, the system may transmit a message to the person upon or after exit. The message may confirm the person's exit with the asset. The message may also include one or more offers or other add-ons. In some examples, such offers may be related to the asset. The offers may provide access to one or more ancillary products or services that may allow the system to capture revenue streams that are in addition to any that may be obtained from transactions related to the asset. Traditionally, these ancillary products or services may be offered during purchase or checkout. By moving these offers to post-exit situations, the system may save time and/or reduce the likelihood of later disagreement or refund if purchased. This may also enhance security of transactions related to the offers as the person may already be identified.

In numerous implementations, a system may obtain a biometric from a person attempting to exit an area with an asset. The system may generate a hash or other digital representation of the biometric, transmit the hash to an IA service, and receive an identification of the person based on the transmitted hash. The system may also identify the asset. In some implementations, the system may use the same component to obtain the biometric and the asset (such as a camera that is used to capture a facial image of a person and a license plate of a rental automobile). In other implementations, the system may use different components (such as a camera used to obtain a facial image of a person and a radiofrequency identification tag, or RFID, reader that is used to detect an RFID tag of an asset). The system may then obtain permissions for the identified person with respect to the identified asset. If the person is permitted, the system may allow the person to exit the area with the asset. The system may then communicate with a payment system to process payment for the asset and send a notification to the person. The notification may include offers or add-ons for ancillary products or services to which the person may be able to respond.

FIG. 1A depicts an example of a system 100 that uses biometrics to control exiting with an asset 193 from an area. As shown, a person 110 is attempting to exit a controlled asset area 102 with an asset. The system 100 (such as using an exit electronic device 101) may prevent that person 110 from exiting the controlled asset area 102 with the asset 193 until verifying that the person 110 is authorized to do so. The system 100 may obtain a digital representation of the biometric for the person 110, identify the person 110 using the digital representation of the biometric, determine whether or not that person 110 has permissions to exit the controlled asset area 102 with the asset 193 (such as by receiving permissions from a database where permissions are stored), and accordingly allow or deny the person 110 to exit with the asset 193.

The system 100 may use a biometric reader device 153 to obtain the digital representation of the biometric. Such a biometric reader device 153 may be any kind of device that may be used to obtain a digital representation of a biometric (such as a digital representation of a fingerprint, a vein scan, a palm-vein scan, a voiceprint, a facial image, a retina image, an iris image, a deoxyribonucleic acid sequence, a heart rhythm, a gait, and so on), such as one or more integrated and/or external still image or video cameras, fingerprint readers, 2D and/or 3D image sensors, capacitive sensors, saliva sensors, deoxyribonucleic acid sensors, heart rhythm monitors, microphones, vein scanners, palm-vein scanners, optical fingerprint scanners, phosphorescent fingerprint scanners, microphones, and so on. The system 100 may also identify the asset 193. The system 100 may use a variety of different asset identification components to identify the asset 193, such as one or more 2D or 3D cameras or image sensors, RFID readers, and so on. In some implementations, the system 100 may use the same component to obtain the digital representation of the biometric and identify the asset 193. In other implementations, different components may be used. Various digital representations of the biometric may then be generated. For example, a hash may be generated from a biometric.

Identification of the person 110 may be performed remotely. For example, the system 100 may transmit a digital representation of a biometric for a person 110 to an IA service. The system 100 may then receive an identification for the person 110 in response.

Similarly, permissions for the person 110 with respect to the asset 193 may be determined remotely. For example, the system 100 may transmit an identification for the person 110 and/or the asset 193 to an external system where permissions are stored. The system 100 may receive the permissions in response.

In various implementations, allowing exit may include processing payment for the asset. In such implementations, the system 100 may communicate with one or more payment processing systems to process payment for the asset. Payment may include a purchase price, a rental fee, and so on.

Figure 1B:
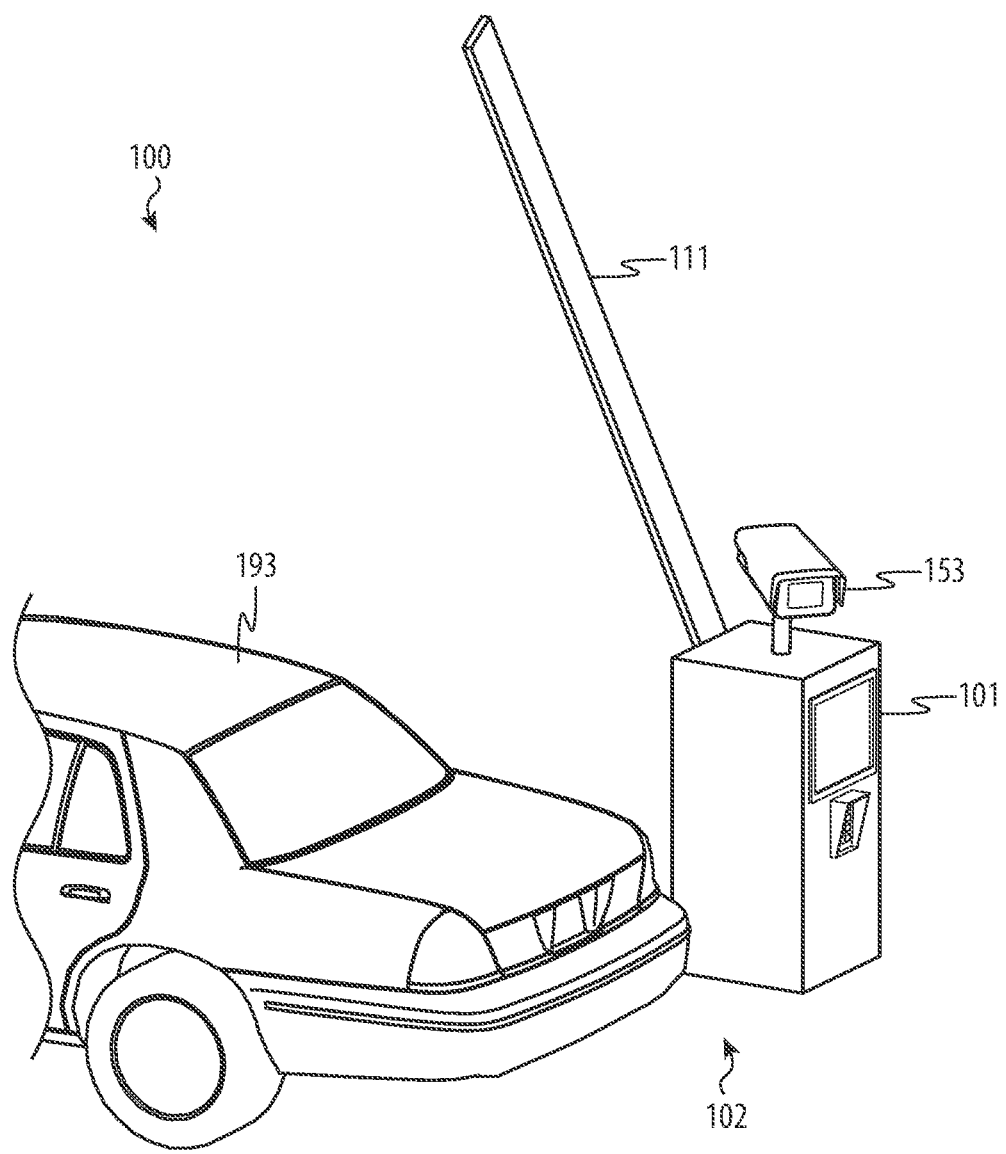
FIG. 1B depicts the system of FIG. 1A after exit with the asset is allowed.
Figure 1C:
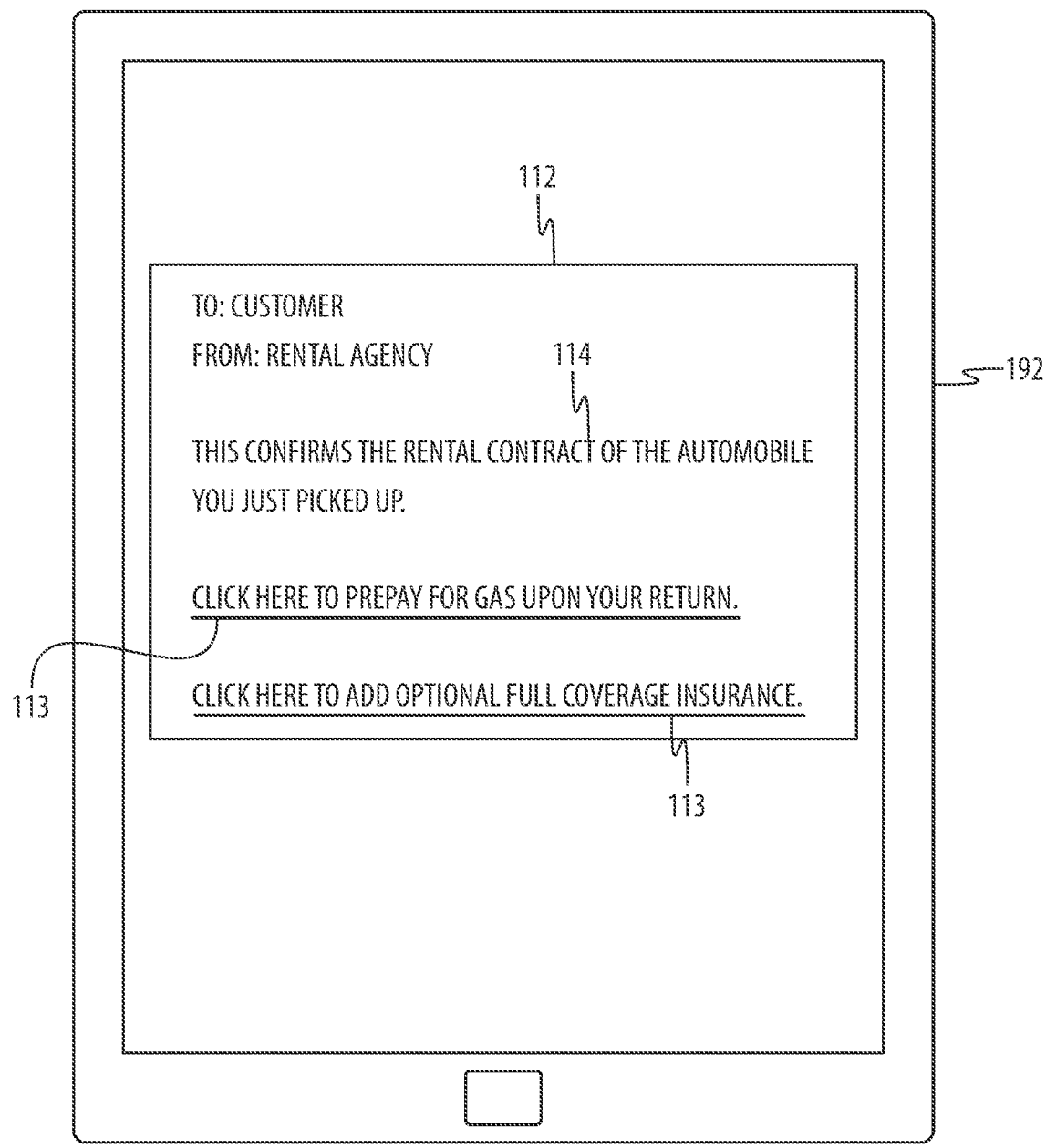
FIG. 1C depicts a message including a confirmation and offers or other add-ons that may be transmitted upon exit with the asset.

FIG. 1B depicts the system 100 of FIG. 1A after exit with the asset 193 is allowed, such as by opening or otherwise operating an exit control mechanism 111. In this example, the system 100 may transmit a confirmation or other message to the person after allowing exit. FIG. 1C depicts a message 112 that may be transmitted upon exit with the asset 193, such as to the person's electronic device 192. The message 112 may include a confirmation 114 and/or offers 113 or other add-ons.

For example, the system 100 shown in FIGS. 1A-1B may be a biometric exit system for an automobile rental agency. The person 110 may arrange to rent an automobile from the automobile rental agency. The person 110 may locate the rented automobile in an automobile rental agency lot. The person 110 may attempt to exit the lot in the rented automobile. In order to do so, the person 110 may encounter a gate or other exit control mechanism 111 controlled or signaled by the biometric exit system to allow or deny exit as shown in FIG. 1A. The biometric exit system may take one or more pictures of the person's face while the person 110 is in the rented automobile at the gate. The biometric exit system may use the person's facial image to identify the person 110. For example, the biometric exit system may transmit the person's facial image or a digital representation generated therefrom to an IA service and receive an identification of the person from the IA service. The biometric exit system may then determine whether or not the person 110 has permission to exit the lot with the rented automobile. For example, the biometric exit system may obtain permissions for the identified person 110 and analyze those permissions to determine whether or not the person 110 has rented the automobile using an account with the automobile rental agency. If so, the biometric exit system may lift the gate and allow the person 110 to exit with the rental automobile as shown in FIG. 1B.

In this example, the biometric exit system may transmit a message 112 to the person 110 after allowing exit. The message 112 may confirm the rental contract. An example of this is shown in FIG. 1C.

With reference to FIGS. 1A-1C, the message 112 may also include one or more offers 113 or other add-ons. In some examples, such offers 113 may be related to the asset. The offers 113 may provide access to one or more ancillary products or services that may allow the system 100 to capture revenue streams that are in addition to those that may be obtained from transactions related to the assets. Traditionally, these ancillary products or services may be offered during purchase or checkout. By moving these offers 113 to post-exit situations, the system 100 may save time and/or reduce the likelihood of later disagreement or refund if purchased. This may also enhance security of transactions related to the offers 113 as the person may already be identified.

In this way, the system 100 may control exit with assets from an area 102 faster than typical systems while using fewer resources and ensuring that inappropriate access is not allowed. As such, the system 100 applies the technologies discussed herein to controlling exit with assets 193 from an area 102.

As illustrated in this example, the message 112 includes a confirmation 114 of the rental contract and offers 113 to prepay for gas upon return of the automobile and to add optional full coverage insurance on the rental. The person 110 may be able to click on and/or otherwise select one or more of these offers 113. If the person 110 responds to one or more of the offers 113, the person's response may be processed to purchase the prepaid gas, the optional full coverage insurance, and so on. In some situations, a time limit may be associated with one or more of the offers 113. For example, the person 110 may be able to prepay for gas within an hour of exiting, but may be unable to select that option after an hour expires.

Although the above biometric exit system is illustrated and described in the context of an automobile rental agency, it is understood that this is an example. In various implementations, control of exit from any kind of area 102 with any kind of tangible or intangible asset 193 may be performed without departing from the scope of the present disclosure. For example, a biometric exit system may control exit with merchandise at a retail store. When the person 110 attempts to exit with an item of merchandise, the biometric exit system may obtain a digital representation of a biometric for the person 110, identify the person 110 based on the digital representation of the biometric, look up profile information for the person 110 including payment information, and allow exit with the item of merchandise upon processing payment. After allowing exit, the biometric exit system may transmit a message 112 to the person 110 including a receipt for the purchase and/or one or more offers 113, such as an offer 113 for an extended warranty, a service contract offer related to the item of merchandise, offers 113 for purchasing of associated items, an offer 113 to arrange an appointment for installation of the item of merchandise, and/or any other kind of offer 113.

Although the above biometric exit system is illustrated and described as capturing a facial image, it is understood that this is an example. In various implementations, any kind of digital representation of a biometric may be captured or otherwise obtained without departing from the scope of the present disclosure. For example, a biometric exit system may use one or more digital representations of a fingerprint, a vein scan, a palm-vein scan, a voiceprint, a facial image, a retina image, an iris image, a deoxyribonucleic acid sequence, a heart rhythm, a gait, and so on.

As described above, in various implementations, the biometric exit system may generate a digital representation of the biometric and use the digital representation to identify the person 110. For example, a hash or other digital representation of the biometric may be generated, transmitted to various other computing or other electronic devices, compared to stored biometric information for the person, and so on. Various configurations are possible and contemplated without departing from the scope of the present disclosure.

In some implementations, the biometric exit system may communicate with an IA service. For example, an IA service may authenticate people as part of an enrollment process. During the enrollment process, the IA service may authenticate that people are who they purport to be and then obtain and store digital representations of biometric data for the people. The IA service may then receive digital representations of biometrics, compare the received digital representations of biometrics to the stored data, and identify people based on matches. For example, the person 110 may have an account with both the biometric exit system and the IA service. The accounts may be linked such that the biometric exit system transmits a digital representation of the person's biometric to the IA service and receives back an identifier for the person's biometric exit system account (such as an automobile rental account number) from the IA service.

In this way, the biometric exit system may enhance security for various assets 193 that may be removed from various areas 102 while simplifying and speeding up transactions. Embodiments may also move offers 113 for ancillary products or services traditionally offered during purchase or checkout to after post-exit situations, saving time and/or reducing the likelihood of later disagreement or refund if purchased. This may also enhance security of transactions related to the offers as the person may already be identified.

The biometric exit system may also provide solutions to problems created in the technological context of automating controlled exit from an area 102 with assets 193. Embodiments may address the technological problem of how to ensure security in an automated system. Similarly, embodiments implementing the exchange of the biometrics (and/or digital representations thereof) and account identifiers may address the technological network problem of appropriately sharing and isolating sensitive data in interacting computer systems.

The above illustrates and describes the biometric exit system as including one or more offers 113 in the transmitted message 112. Such offers 113 may be any kind of offer 113. In various implementations, the biometric exit system may store one or more defaults or preferences for the person 110 that may specify various options relating to the asset 193 upon exit or various offers 113 that may be provided. When the person 110 attempts to exit with an asset 193, the biometric exit system may identify the person 110 using the obtained digital representation of the biometric and look up the person's defaults. The biometric exit system may then allow or deny exit and configure a transaction related to the asset 193 based on the person's defaults. One or more offers 113 transmitted upon exit may also be configured based on the defaults, though offers 113 unrelated to any defaults may be transmitted as well.

For example, a person's automobile rental preferences may not specify to prepay gas or to purchase optional full coverage insurance. Alternatively, the person's automobile rental preferences may specify not to prepay gas or to purchase optional full coverage insurance. As such, based on the person's preferences, gas may not be prepaid for the person and the optional full coverage insurance may not be purchased upon allowing exit. As these available options were not purchased based on the person's preferences, they may be selected as offers 113 to include in the message 112. Alternatively, another person's automobile rental preferences may specify to prepay gas and purchase optional full coverage insurance. As such, payment information stored for the person 110 may be automatically used to prepay for gas and purchase the optional full coverage insurance upon exit.

In some implementations, a biometric exit system may interact with various status programs, loyalty programs, or other programs. In such implementations, the biometric exit system may process exit with the asset according to preferences a person 110 has specified in an account with such a program, determine whether to accord the person 110 one or more entitlements based on the person's program account, credit a transaction associated with exit to the person's program account, provide the person one or more discounts or offers specific to the person's program account, and so on.

For example, a person 110 may have an account with a loyalty program. The person's loyalty program account may be associated with a "high status." People 110 with loyalty program accounts that do not have the high status, such as a "normal status" may be sent a message 112 including one or more offers upon exiting with an asset. However, the high status associated with the person's loyalty program account may automatically provide the person 110 to a streamlined/low friction experience, or provide the person 110 such an experience if specified in the person's loyalty program account. The streamlined/low friction experience may allow the person 110 to exit with the asset 193 without transmitting any offers 113 to the person 110, or to be transmitted fewer offers 113. For example, offers 113 to prepay gas or purchase optional full coverage insurance may not be transmitted. In some cases, one or more options related to offers 113 that would have otherwise been transmitted may be selected automatically. For example, the person's loyalty account may specify to automatically prepay gas, not select optional full coverage insurance, and not transmit any offers 113 to the person 110.

In various examples, the biometric exit system may enable one or more perks to be provided to the person 110 upon exit. In some implementations, such perks may include loyalty rewards. For example, a kiosk at an exit may present a personalized greeting to the person 110 and/or dispense a complimentary soft drink or bottled water to the person upon exit. By way of another example, exiting with the asset may earn sufficient loyalty rewards points for the person's loyalty rewards account that the person 110 is entitled to a free night at a local hotel and a kiosk may dispense a voucher for the free night upon exit. Other examples may include emailing the person 110 a dinner coupon for a local restaurant, providing access to a local and expert concierge service, and so on.

Although the above biometric exit system is illustrated and described as including particular offers 113 in the message 112, it is understood that this is an example. In various implementations, any number of offers 113 may be included. For example, an automobile rental lot may store keys in the automobiles available for rental. A person 110 may have rented a particular class of automobile (economy, midsize, full size, luxury, and so on) and may select any of that class from a lot. The biometric exit system may identify the person 110 based on an obtained biometric and the selected automobile (such as by communicating with a transponder of the automobile, an RFID tag on the vehicle, capturing a license plate image of the automobile, and so on) when the person 110 exits, look up permissions for the person 110 based on the identified automobile, and allow or deny exit based on the permissions. For example, the biometric exit system may allow exit if the person 110 has permissions to rent the class to which the identified automobile belongs. By way of another example, the biometric exit system may also allow exit if the identified automobile belongs to a higher class than the person's permissions allow. In such a case, the biometric exit system may provide the person 110 notice of this in the message and provide the person 110 the option of either returning the identified automobile within a time limit (such as twenty minutes) or accepting an additional charge for the higher class.

Figure 2:
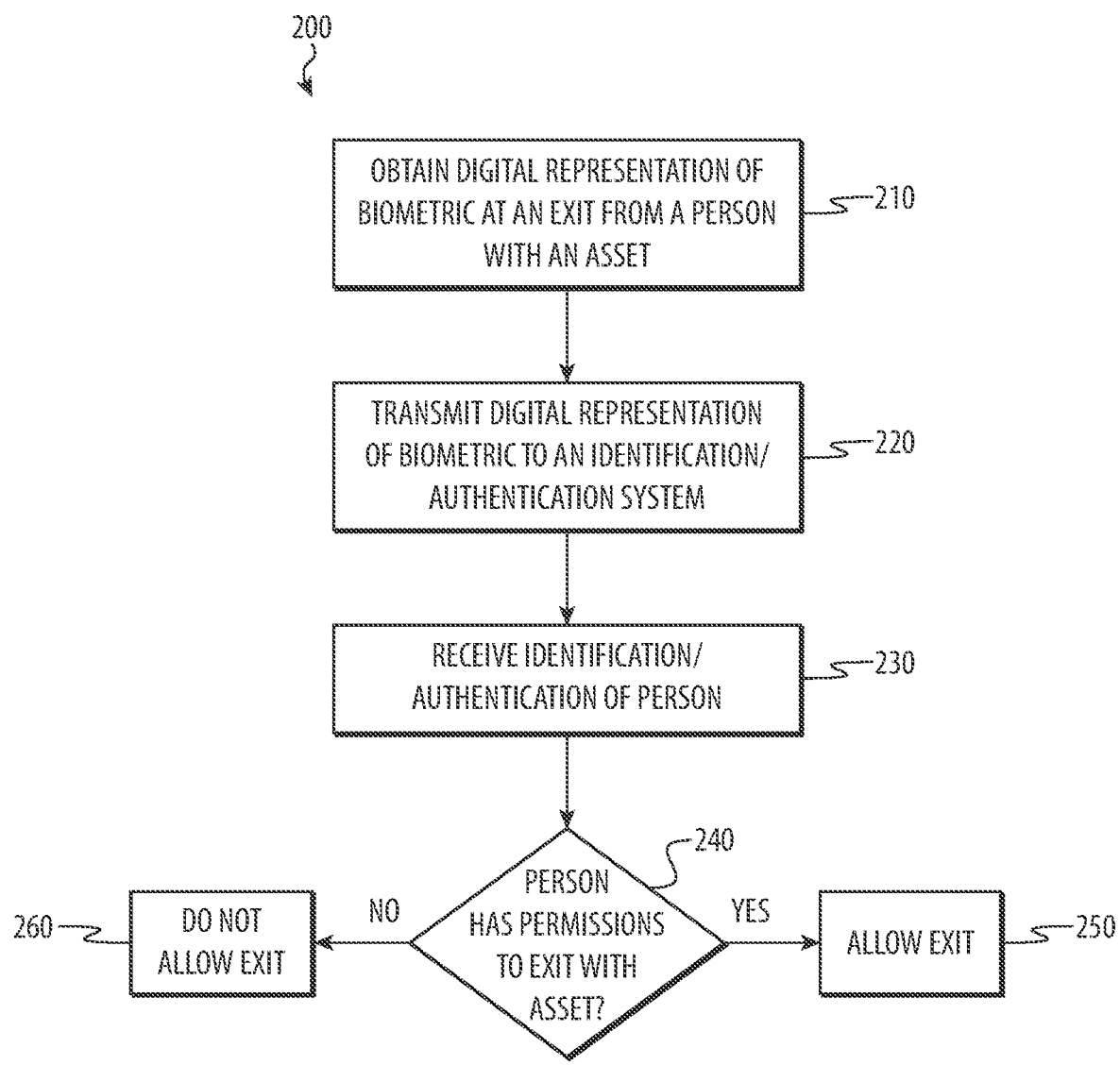
FIG. 2 depicts a flowchart illustrating a first example method for biometric exit with an asset.

FIG. 2 depicts a flowchart illustrating a first example method 200 for biometric exit with an asset. This first example method may be performed by the system 100 of FIGS. 1A-1B.

At operation 210, one or more electronic devices (the exit electronic devices 101, 301 of FIGS. 1A-1B and/or 3) may obtain a digital representation of a biometric at an exit from a person with an asset. The electronic device may use a biometric reader device to obtain a digital representation of a biometric. Such a biometric reader device may be any kind of device that may be used to obtain a digital representation of a biometric (such as a hash or other digital representation of a fingerprint, a vein scan, a palm-vein scan, a voiceprint, a facial image, a retina image, an iris image, a deoxyribonucleic acid sequence, a heart rhythm, a gait, and so on), such as one or more integrated and/or external still image or video cameras, fingerprint readers, 2D and/or 3D image sensors, capacitive sensors, saliva sensors, deoxyribonucleic acid sensors, heart rhythm monitors, microphones, vein scanners, palm-vein scanners, optical fingerprint scanners, phosphorescent fingerprint scanners, microphones, and so on. At operation 220, the electronic device may transmit the digital representation of the biometric to an IA service system. At operation 230, the electronic device may receive an identification and/or authentication of the person from the IA service.

The flow may then proceed to operation 240 where the electronic device may determine whether or not the person has permissions to exit with the asset. The electronic device may receive permissions from a local or remote database where permissions are stored as part of determining whether or not the person has permissions. If so, the flow may then proceed to operation 250 where the electronic device may allow exit. Otherwise, the flow may then proceed to operation 260 where the electronic device may not allow exit.

In various implementations, the electronic device may transmit a message to the person upon allowing exit with the asset. The message may confirm that the person exited with the asset. The message may also include one or more offers or other add-ons. The offers may provide access to one or more ancillary products or services that may allow capture or revenue streams that are in addition to those that may be obtained from any transactions related to the assets.

In some implementations, the first example method 200 may be performed by a computing system that controls a gate at an automobile rental lot. The computing system may capture a person's facial image when the person attempts to exit with an automobile, transmit a digital representation of the person's facial image to an IA service where the person has an account that has been linked to the person's automobile rental account, and receive information from the IA service identifying the person's automobile rental account. The computing system may determine if the person's automobile rental account has permission to that particular automobile. If so, the person's automobile rental account may cause the gate to allow the person to exit with the automobile.

In various implementations, the person's automobile rental account and account with the IA service may be linked in a variety of ways. For example, the person may visit an agent of the automobile rental agency and provide details regarding their IA service account in order to link the accounts. By way of another example, the person may visit an agent of the IA service and provide details regarding their automobile rental agency account in order to link the accounts. In still other examples, the person may use a kiosk for the automobile rental agency and provide details regarding their IA service account or a kiosk for the IA service and provide details regarding their automobile rental agency account. In yet other implementations, the person may visit a web site for either the automobile rental agency or the IA service that uses OAuth or similar technology to allow them to log into the person's other account so that the web site is able to access a limited amount of information about the person's other account in order to link the two accounts. By way of still other examples, an entity with access to information on accounts of both systems may evaluate the information to link accounts of people who have both accounts and have not yet linked, subject to any privacy restrictions that may be imposed on the two sets of accounts. In yet other examples, messages may be transmitted from one system to people with an account prompting them to provide their information to the other system in order to link their accounts. Various configurations are possible and contemplated without departing from the scope of the present disclosure.

In various examples, this first example method 200 may be implemented as a group of interrelated software modules or components that perform various functions discussed herein. These software modules or components may be executed within a cloud network and/or by one or more computing devices, such as the exit electronic devices 101, 301 of FIGS. 1A-1B and/or 3.

Although the above is illustrated and described as using the electronic device using the IA service to identify the person using the digital representation of the biometric, it is understood that this is an example. In other implementations, the electronic device may use other techniques to identify the person using the digital representation of the biometric.

For example, in some implementations, the electronic device may scan an identity document (such as a driver's license or a passport). The electronic device may compare information from the scan which may then be compared to the digital representation of the biometric to identify the person. For example, the electronic device may extract a name and a photograph from the identity document. The digital representation of the biometric may be an image of the person's face or digital representation thereof. If digital representation of the biometric matches the photograph extracted from the identity document, the electronic device may identify the person as the extracted name. Various configurations are possible and contemplated without departing from the scope of the present disclosure.

Figure 3:
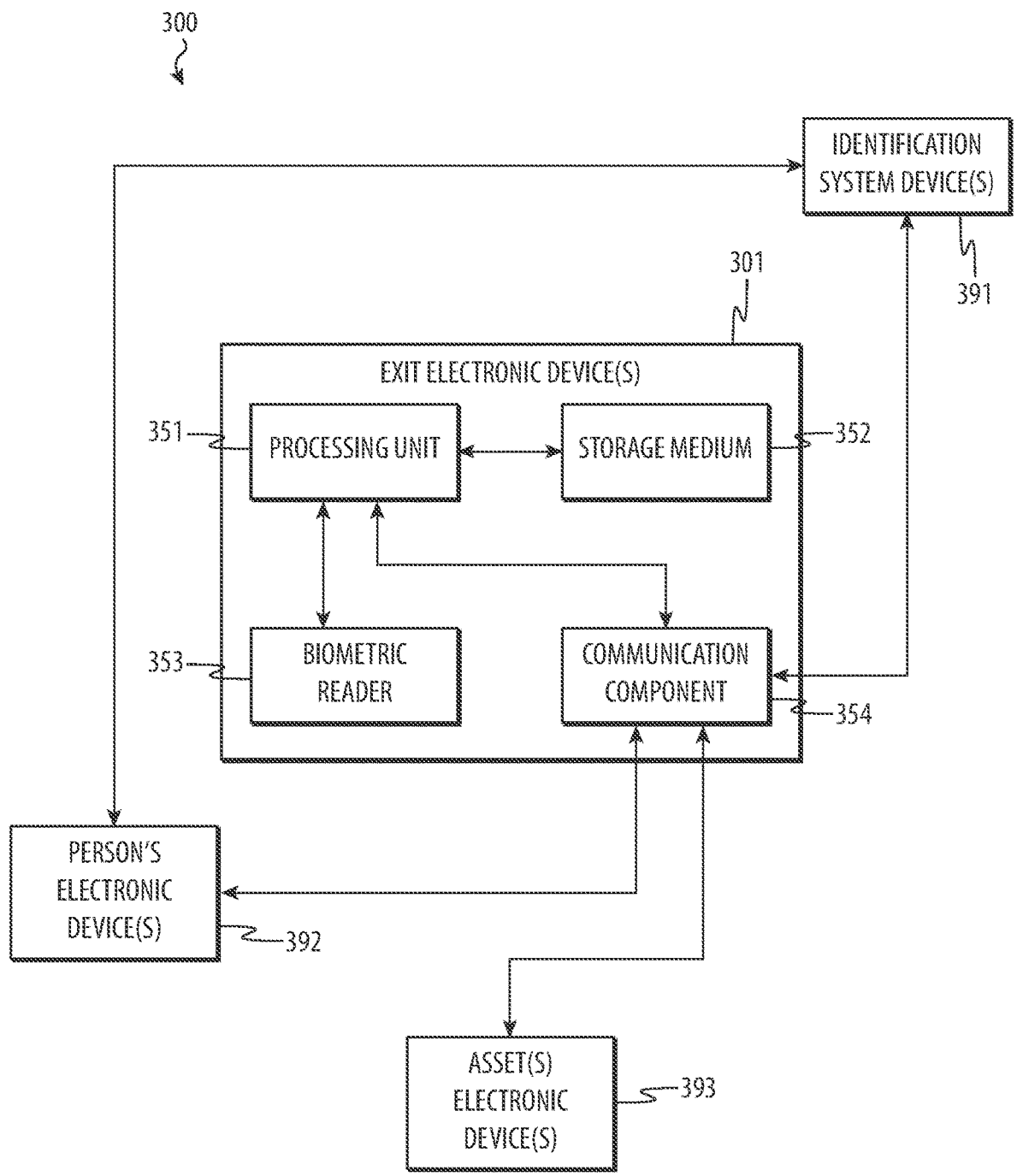
FIG. 3 depicts relationships between example components of an example system for controlling exit with one or more assets from an area using one or more biometrics.

FIG. 3 depicts relationships between example components of an example system 300 for controlling exit with one or more assets from an area using one or more biometrics. The system 300 may include one or more exit electronic devices 301. The exit electronic device 301 may be a computing device that includes one or more processing units 351 or other processors or controllers, one or more non-transitory storage media 352, one or more biometric reader devices 353 (which may be any kind of device that may be used to obtain a digital representation of a hash or other digital representation of a fingerprint, a vein scan, a palm-vein scan, a voiceprint, a facial image, a retina image, an iris image, a deoxyribonucleic acid sequence, a heart rhythm, a gait, and so on, such as one or more integrated and/or external still image or video cameras, fingerprint readers, 2D and/or 3D image sensors, capacitive sensors, saliva sensors, deoxyribonucleic acid sensors, heart rhythm monitors, microphones, vein scanners, palm-vein scanners, optical fingerprint scanners, phosphorescent fingerprint scanners, microphones, and so on), communication components 354, and/or various other components. The processing unit 351 may execute one or more instructions stored in the storage medium 352 to perform various exit electronic device 301 functions. For example, the processing unit 351 may perform a method for biometric exit with an asset, such as the first example method 200.

The system 300 of FIG. 3 may also include one or more IA service system devices 391, electronic devices 392 of a person whose exit with an asset is controlled by the exit electronic device 301, an electronic device of the asset 393, and so on. These devices may be any kind of device, such as a cellular telephone, a wearable device, a transponder, a mobile computing device, a tablet computing device, a laptop computing device, a desktop computing device, a transponder, an RFID tag, and so on. One or more of these devices may include various components similar to those discussed above with respect to the exit electronic device.

In some implementations, the system 300 may also communicate with one or more payment processing systems, such as one or more credit card processing or banking systems. The system 300 may communicate with such payment processing systems as part of processing payment for an asset upon exit.

The exit electronic device may communicate with one or more of these devices using the communication component over one or more wired and/or wireless networks as part of a method for biometric exit. Similarly, several of the above devices may also communicate with each other as part of the method for biometric exit.

Figure 4:
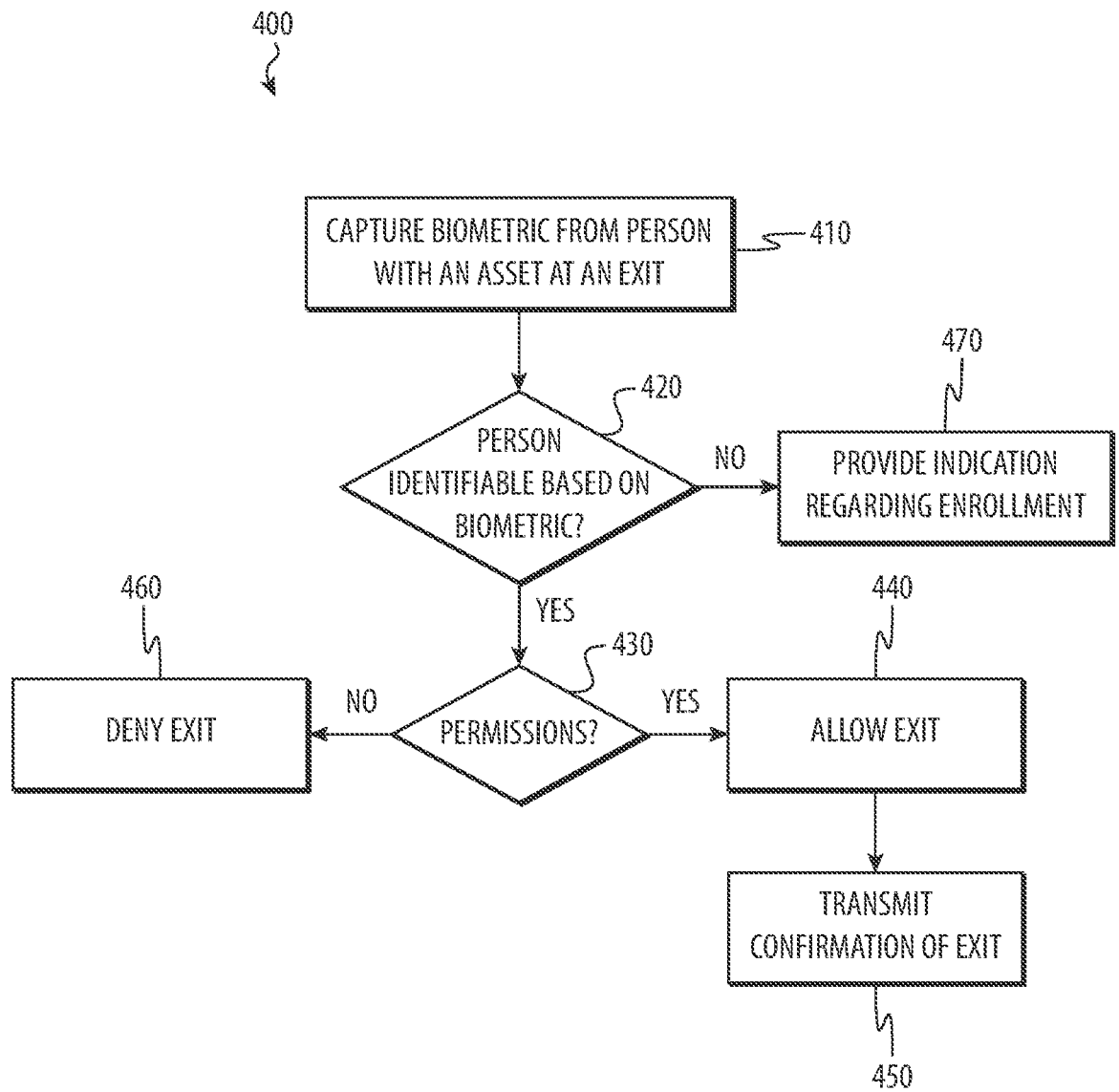
FIG. 4 depicts a flowchart illustrating a second example method for biometric exit with an asset.

FIG. 4 depicts a flowchart illustrating a second example method 400 for biometric exit with an asset. This second example method 400 may be performed by the system 100 of FIGS. 1A-1B and/or the system 300 of FIG. 3.

At operation 410, one or more electronic devices (the exit electronic devices 101, 301 of FIGS. 1A-1B and/or 3) may capture a digital representation of a biometric from a person with an asset at an exit. At operation 420, the electronic device may determine whether or not the person is identifiable based on the digital representation of the biometric. The person may be identifiable based on the biometric if the person is enrolled in an IA service used to identify the person based on the biometric. The person may not be identifiable if the person is not enrolled or if the person's account for the IA service has not yet been linked with the person's account in a system involving the electronic device that performs the second example method 400. If so, the flow may proceed to operation 430. Otherwise, the flow may proceed to operation 470.

At operation 430, the electronic device may determine whether or not the person has permissions to exit with the asset. The electronic device may receive permissions from a local or remote database where permissions are stored as part of making this determination. If so, the flow may proceed to operation 440 where the electronic device may allow exit with the asset. Otherwise, the flow may proceed to operation 460 where the electronic device may deny exit with the asset.

At operation 440, after exit is allowed, the flow may proceed to operation 450. At operation 450, the electronic device may transmit a confirmation of exit with the asset to the person. In various implementations, the confirmation of exit with the asset may also include one or more offers or other add-ons. The offers may provide access to one or more ancillary products or services that may allow capture or revenue streams that are in addition to those that may be obtained from any transactions related to the assets.

At operation 470, after it is determined that the person is not identifiable based on the biometric, the electronic device may provide an indication to the person. The indication may include information regarding enrolling in an IA service. Alternatively, the indication may include information regarding linking an account in the IA service with one in a system that includes the electronic device that performs the second example method 400.

In various examples, this second example method 400 may be implemented as a group of interrelated software modules or components that perform various functions discussed herein. These software modules or components may be executed within a cloud network and/or by one or more computing devices, such as the exit electronic devices 101, 301 of FIGS. 1A-1B and/or 3.

Figure 5:
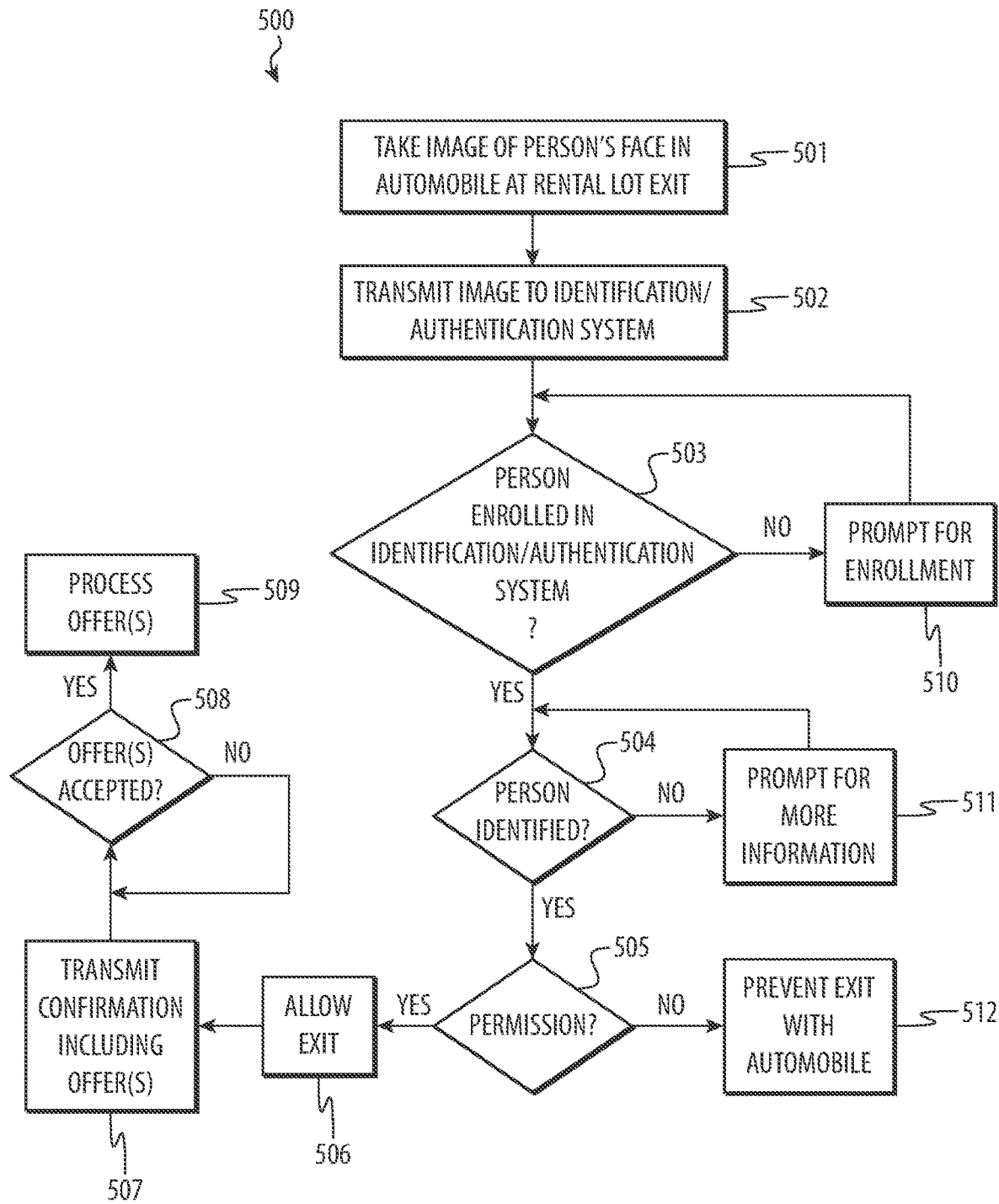
FIG. 5 depicts a flowchart illustrating a third example method for biometric exit with an asset.

FIG. 5 depicts a flowchart illustrating a third example method 500 for biometric exit with an asset. This third example method 500 may be performed by the system 100 of FIGS. 1A-1B and/or the system 300 of FIG. 3.

At operation 501, one or more electronic devices (the exit electronic devices 101, 301 of FIGS. 1A-1B and/or 3) may take an image of a person's face in an automobile at a rental lot exit. At operation 502, the electronic device may transmit the image or a digital representation thereof to an IA service system. At operation 503, the electronic device may determine whether or not the person is enrolled in the IA service. If so, the flow may proceed to operation 504. Otherwise, the flow may proceed to operation 510.

At operation 504, the electronic device may determine whether or not the person is identified. For example, a person may not be identified even if enrolled in the IA service if the person has not linked an account in the IA service with an account in a system including the electronic device performing the method 500. The IA service may be configured to return an identifier for the account in the system performing the method 500 if the accounts are linked, but may be unable to return the identifier if the accounts have not been linked. If so, the flow may proceed to operation 505. Otherwise, the flow may proceed to operation 511.

At operation 505, the electronic device may determine whether or not the person has permission to exit the rental lot with the automobile. The electronic device may receive permissions from a local or remote database where permissions are stored as part of such a determination. If so, the flow may proceed to operation 506 where the electronic device may allow exit. Otherwise, the flow may proceed to operation 512 where the electronic device may prevent exit.

After exit is allowed at operation 506, the flow may proceed to operation 507. At operation 507, the electronic device may transmit a confirmation message to the person. The message may confirm exit, one or more terms of a rental contract associated with the automobile, and so on. The message may include one or more offers to the person. For example, the offers may include offers to prepay for gas upon return of the automobile, offers to reserve a hotel room, offers to purchase optional full coverage insurance for the automobile, offers to upgrade or extend a rental term of the automobile, offers to make a restaurant reservation, other purchase offers related to the automobile, and so on. The flow may then proceed to operation 508 where the electronic device may determine whether or not one or more of the offers are accepted. If so, the flow may proceed to operation 509 where the electronic device may process the accepted offer. Otherwise, the flow may return to operation 508 where the electronic device may again determine if one or more of the offers are accepted.

At operation 510, after the electronic device determines that the person is not enrolled in the IA service, the electronic device may prompt the person to enroll. Prompting for enrollment may include transmitting a message to an electronic device belonging to the person, prompting the person via an electronic device at the exit, and so on. Prompting for enrollment may include obtaining biographic information for the person, obtaining an image of an identity document for the person (such as a driver's license or a passport), obtaining information for the person from a third party database (such as using the biographic information, the image of the identity document, and so on), authenticating the person's identity (such as using the biographic information, the image of the identity document, and so on), obtaining payment information from the person, capturing one or more biometrics for the person to associate with their authenticated identity, and so on. The flow may then return to 503 where the electronic device may verify whether or not the person enrolled in the IA service.

At operation 511, after it is determined that the person is not identified, the electronic device may prompt the person for more information. The information may be information that allows the person to be identified. For example, the person may be enrolled in the IA service so that the IA service can provide an indication regarding the identity of the person, but the person may not have linked an IA service account with an account of the system performing the method 500. For example, the IA service may be able to return the person's name, but may not be able to identify the person's account number on the system performing the method 500. This may not be sufficient information for a system that includes the electronic device performing the method 500 to identify the person, particularly if the system includes accounts for multiple people with the same name. As such, the electronic device may prompt the person (such as via the person's cell phone or other electronic device, an on-site kiosk or other electronic device associated with the system) to enter the person's account number for the system or other identifying information that the system can use to identify the person. The electronic device may use this information to identify the person (such as to look up whether or not the person has permission with the system for the automobile) and/or used to link the person's accounts.

In various examples, this third example method 500 may be implemented as a group of interrelated software modules or components that perform various functions discussed herein. These software modules or components may be executed within a cloud network and/or by one or more computing devices, such as the exit electronic devices 101, 301 of FIGS. 1A-1B and/or 3.

Although the above is illustrated and described as the electronic device obtaining a digital representation of a biometric at an exit in order to determine whether or not to allow a person to exit with an asset, it is understood that these are examples. In various implementations, other arrangements are possible and contemplated without departing from the scope of the present disclosure.

For example, in some implementations, the electronic device may capture a digital representation of a biometric at the entrance to a controlled asset area. The electronic device may identify the person using the digital representation of the biometric and may determine whether or not the identified person has permissions to enter the controlled asset area and/or to exit the controlled asset area with an asset.

Figure 6:
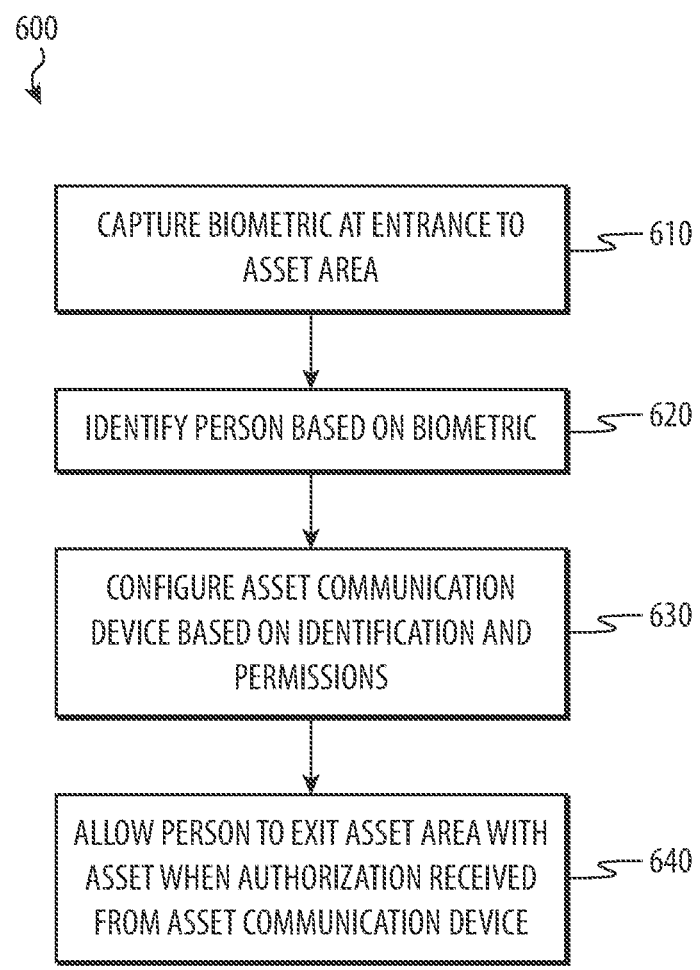
FIG. 6 depicts a flowchart illustrating a fourth example method for biometric exit with an asset.

Accordingly, FIG. 6 depicts a flowchart illustrating a fourth example method 600 for biometric exit with an asset.

This fourth example method 600 may be performed by the system 100 of FIGS. 1A-1B and/or the system 300 of FIG. 3.

At operation 610, one or more electronic devices (the exit electronic devices 101, 301 of FIGS. 1A-1B and/or 3) may capture a digital representation of a biometric at an entrance to an asset area. Assets in the asset area may be controlled such that the asset area may be considered an asset control area. At operation 620, the electronic device may identify the person using the digital representation of the biometric. At operation 630, the electronic device may configure a communication device or other component of the asset using the identification of the person and permissions the electronic device may determine the identified person has with respect to the asset. At operation 640, the electronic device may allow the person to exit the asset area with the asset when an authorization is received from the asset communication device.

For example, the asset area may be a car rental lot. When the person enters the car rental lot, an image may be captured of the person's face. The person may be identified based on the image and it may be determined that the person has rented a particular car. The car may have a communication device that may be configured to indicate that the person is authorized to exit the car rental lot with the car. The person may get in the car and drive to a closed exit gate. The exit gate may include an electronic device that communicates with the communication device. Upon receiving an indication from the communication device that exit is authorized, the electronic device may open the exit gate.

In some examples, the method 600 may interact with various status programs, loyalty programs, or other programs. For example, once a person is identified using the biometric, a loyalty account for the person may be ascertained. Various actions may be taken based on preferences associated with the person's loyalty account, a status of the person's loyalty account, and so on.

For example, the person's loyalty account may indicate a preferred automobile type (e.g., luxury car, midsize sedan, and so on) or specific preferred automobile (e.g., Corvette, convertible Mustang, and so on). When the person's loyalty account is identified, directions may be provided to the person to guide the person to an automobile meeting their preferences or portion of a rental lot where such automobiles are located. Guidance may be provided by an electronic overhead display, using strips of lights positioned on the ground, by transmitting visual depictions of the rental lot and the person's position to the person's mobile device (such as a cellular telephone or tablet computing device), and so on.

By way of another example, automobile properties may be identified from the person's loyalty account and used to prepare the automobile for the person. In some implementations, ergonomic or other preferences may be specified in the person's loyalty account. Upon identification of the person's loyalty account, the preferences may be obtained and transmitted to the automobile. For example, seating posture, mirror position, stereo settings, drive-train characteristics, and so on may be adjusted for the person. In this way, the automobile may be specifically prepared for the person when the person arrives at the automobile.

In some examples, the person may allow a system implementing the method 600 to link to information regarding the person's travel plans. In such an example, various maps, directions, or other information may be transmitted to the automobile in order to be available to the person if needed. For example, a global positioning system or other navigation component associated with the automobile may be preprogrammed with directions to a hotel where the person has a reservation, a business where the person has an appointment, a restaurant where the person has a reservation, a next destination that has been indicated for the person, and so on. Various configurations are possible and contemplated without departing from the scope of the present disclosure.

In various examples, this fourth example method 600 may be implemented as a group of interrelated software modules or components that perform various functions discussed herein. These software modules or components may be executed within a cloud network and/or by one or more computing devices, such as the exit electronic devices 101, 301 of FIGS. 1A-1B and/or 3.

By way of another example, in some implementations, a digital representation of a biometric may be captured by an asset itself. The person may be identified based on the biometric and it may be determined whether or not the identified person has permissions to exit a controlled asset area where the asset is located with the asset.

Figure 7:
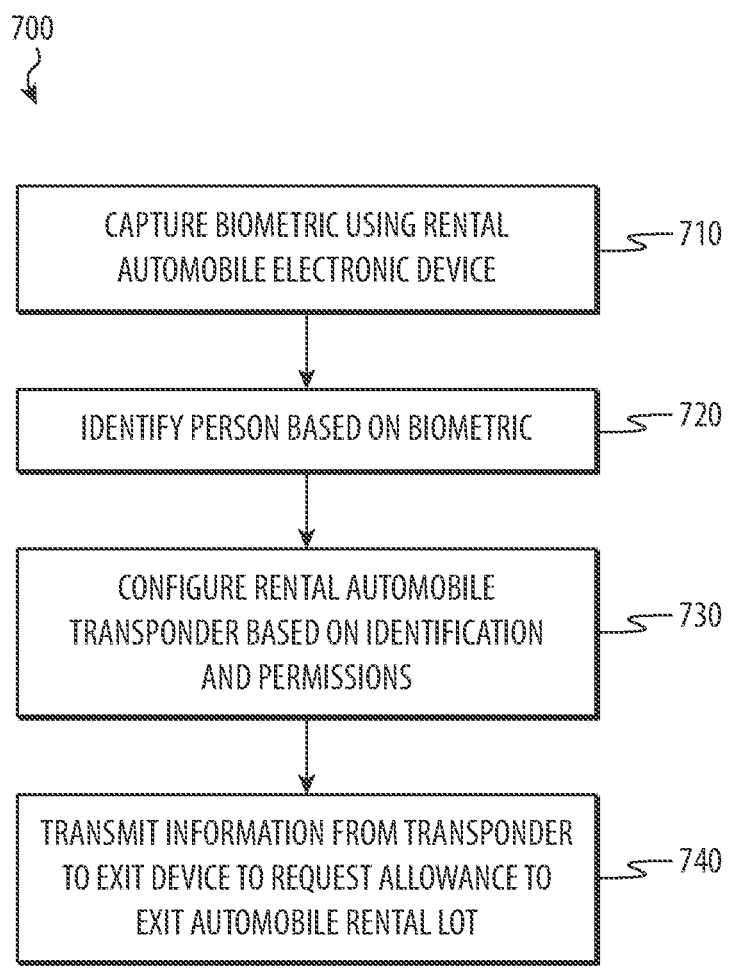
FIG. 7 depicts a flowchart illustrating a fifth example method for biometric exit with an asset.

Accordingly, FIG. 7 depicts a flowchart illustrating a fifth example method 700 for biometric exit with an asset. This fifth example method 700 may be performed by the system 100 of FIGS. 1A-1B and/or the system 300 of FIG. 3.

At operation 710, one or more electronic devices (the exit electronic devices 101, 301 of FIGS. 1A-1B and/or 3) may capture a digital representation of biometric using an electronic device of a rental automobile. For example, the automobile may include an attached camera that takes a picture of a person's face and the electronic device may receive the picture from the attached camera. By way of another example, a fingerprint reader configured on a door handle of the automobile may capture a digital representation of a fingerprint of the person when the person opens the door to the automobile and the electronic device may receive the digital representation of the fingerprint from the fingerprint reader. At operation 720, the electronic device may identify the person using the digital representation of the biometric. At operation 730, the electronic device may configure a transponder of the rental automobile using the identification and permissions the identified person has with respect to the automobile. At operation 740, the electronic device may configure the transponder to transmit information to an exit device to request allowance to exit an automobile lot based on the identification and permissions with which the transponder is configured.

In various examples, this fifth example method 700 may be implemented as a group of interrelated software modules or components that perform various functions discussed herein. These software modules or components may be executed within a cloud network and/or by one or more computing devices, such as the exit electronic devices 101, 301 of FIGS. 1A-1B and/or 3.

Although the above illustrates and describes a number of embodiments, it is understood that these are examples. In various implementations, various techniques of individual embodiments may be combined without departing from the scope of the present disclosure.

In various implementations, a biometric exit system may include a biometric reader device, a non-transitory storage medium that stores instructions, and a processing unit. The processing unit may execute the instructions to transmit a digital representation of a biometric for a person at an exit with an asset; receive an identification for the person; receive permissions for the person using the identification; and, when the permissions indicate the person is permitted, allow the person to exit with the asset.

In some examples, the biometric reader device may be a camera. In various examples, the digital representation of the biometric may be an image of at least a portion of a face of the person. In a number of examples, the digital representation of the biometric may be an image of at least an iris of the person. In various examples, the digital representation of the biometric may be a digital representation of a fingerprint of the person. In a number of examples, the permissions may be a rental contract associated with the asset.

In some implementations, a biometric exit system may include a biometric reader device, an exit control mechanism, a non-transitory storage medium that stores instructions, and a processing unit. The processing unit may execute the instructions to receive a biometric exit system identifier for a person from an identification system in response to transmitting a digital representation of a biometric for the person; receive permissions for the person with respect to an asset in an asset control area using the biometric exit system identifier; and, when the permissions indicate the person is authorized, signal the exit control mechanism to allow the person to exit with the asset.

In various examples, the biometric exit system identifier may be an automobile rental account number. In some examples, the processing unit may process payment for the asset. In a number of examples, the asset is merchandise at a store. In various examples, the processing unit may process a payment for the asset by communicating with a payment system. In some examples, the processing unit may identify the asset. In a number of examples, the processing unit may signal the exit control mechanism to prevent the person from exiting with the asset when the permissions indicate the person is unauthorized. In various examples, the exit control mechanism may be a gate and the processing unit may signal the exit control mechanism to allow the person to exit with the asset by opening the gate.

In a number of implementations, a biometric exit system may include a biometric reader device, a non-transitory storage medium that stores instructions, and a processing unit. The processing unit may execute the instructions to obtain an identification for a person at an exit with an asset using a digital representation of a biometric; identify the asset; when the person has permission to exit with the asset, allow the person to exit; and transmit a message that includes at least one offer.

In various examples, the processing unit may be operable to process the at least one offer using a response to the message. In some examples, the processing unit may be operable to process the at least one offer if a response to the message is received within a period of time. In a number of examples, the at least one offer may include a purchase offer related to the asset. In some examples, the asset may be a rental automobile. In various examples, the at least one offer may be an offer to prepay gas for a rental automobile.

The present disclosure relates to biometric exit with an asset. A biometric exit system may obtain one or more biometrics from a person with one or more assets at an exit. The system may obtain an identification of the person using a digital representation of the biometric and permissions regarding whether or not the person may exit with the asset. If so, the system may allow the person to exit with the asset. In some implementations, the system may transmit a message to the person after allowing the person to exit with the asset. The message may be a confirmation of a transaction relating to the exit, such as a confirmation of a rental contract or purchase receipt. The message may also include one or more offers related to the asset and/or exit. The person may be able to respond to the message in order to accept and/or otherwise interact with the offer.

The present disclosure recognizes that biometric and/or other personal data is owned by the person from whom such biometric and/or other personal data is derived. This data can be used to the benefit of those people. For example, biometric data may be used to conveniently and reliably identify and/or authenticate the identity of people, access securely stored financial and/or other information associated with the biometric data, and so on. This may allow people to avoid repeatedly providing physical identification and/or other information.

The present disclosure further recognizes that the entities who collect, analyze, store, and/or otherwise use such biometric and/or other personal data should comply with well-established privacy policies and/or privacy practices. Particularly, such entities should implement and consistently use privacy policies and practices that are generally recognized as meeting or exceeding industry or governmental requirements for maintaining security and privately maintaining biometric and/or other personal data, including the use of encryption and security methods that meets or exceeds industry or government standards. For example, biometric and/or other personal data should be collected for legitimate and reasonable uses and not shared or sold outside of those legitimate uses. Further, such collection should occur only after receiving the informed consent. Additionally, such entities should take any needed steps for safeguarding and securing access to such biometric and/or other personal data and ensuring that others with access to the biometric and/or other personal data adhere to the same privacy policies and practices. Further, such entities should certify their adherence to widely accepted privacy policies and practices by subjecting themselves to appropriate third party evaluation.

Additionally, the present disclosure recognizes that people may block the use of, storage of, and/or access to biometric and/or other personal data. Entities who typically collect, analyze, store, and/or otherwise use such biometric and/or other personal data should implement and consistently prevent any collection, analysis, storage, and/or other use of any biometric and/or other personal data blocked by the person from whom such biometric and/or other personal data is derived.

Although particular methods involving particular operations have been illustrated and described, it is understood that these are examples. In various implementations, various arrangements of the same, similar, and/or different operations may be performed without departing from the scope of the present disclosure. Various configurations are possible and contemplated.

Aspects of the present disclosure may be performed by one or more devices, such as one or more computing devices, that may be configured as part of a system. For example, one or more computing devices that perform one or more aspects of this disclosure may be part of a cloud computing system, cooperative computing arrangement, and so on. Such devices may include one or more processors or other controllers or processing units, one or more non-transitory storage media (which may take the form of, but is not limited to, a magnetic storage medium; optical storage medium; magneto-optical storage medium; read only memory; random access memory; erasable programmable memory; flash memory; and so on), and/or other components. The processing unit may execute one or more instructions stored in the non-transitory storage medium to perform one or more processes that utilize one or more of the techniques disclosed herein.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A biometric exit system, comprising:
    a non-transitory storage medium that stores instructions;
    a physical exit control mechanism operable to prevent exit; and
    a processing unit that executes the instructions to:
        transmit a digital representation of a biometric for a person at an exit with an asset;
        receive an identification for the person;
        receive permissions for the person using the identification;
        when the permissions indicate the person is permitted, allow the person to exit with the asset by signaling the physical exit control mechanism;
        access stored preferences for the person using the identification;
        upon determining that the stored preferences indicate to automatically accept at least one offer on exit, automatically accept the at least one offer that is specified in the stored preferences when the person exits with the asset; and
        upon determining that the stored preferences do not indicate to automatically accept the at least one offer on exit, after the person exits with the asset, provide the at least one offer to the person.

2. The biometric exit system of claim 1, wherein the digital representation of the biometric is captured by a camera.

3. The biometric exit system of claim 1, wherein the digital representation of the biometric comprises an image of at least a portion of a face of the person.

4. The biometric exit system of claim 1, wherein the permissions comprise a processed payment associated with the asset.

5. The biometric exit system of claim 1, wherein the permissions comprise an indication of a purchase associated with the asset.

6. The biometric exit system of claim 1, wherein the permissions comprise a rental contract associated with the asset.

7. A biometric exit system, comprising:
    a biometric reader device;
    a non-transitory storage medium that stores instructions; and
    a processing unit that executes the instructions to:
        receive a biometric exit system identifier for a person from an identification system in response to transmitting a digital representation of a biometric for the person;
        receive permissions for the person with respect to an asset in an asset control area using the biometric exit system identifier;
        when the permissions indicate the person is authorized, signal a physical exit control mechanism that is operable to prevent exit to allow the person to exit with the asset;
        use the biometric exit system identifier to access stored preferences for the person;
        upon determining that the stored preferences indicate to automatically accept at least one offer on exit, automatically accept the at least one offer that is specified in the stored preferences when the person exits with the asset; and
        upon determining that the stored preferences do not indicate to automatically accept the at least one offer on exit, after the person exits with the asset, provide the at least one offer to the person.

8. The biometric exit system of claim 7, wherein the biometric exit system identifier comprises an account number.

9. The biometric exit system of claim 7, wherein the processing unit initiates processing of a payment for the asset.

10. The biometric exit system of claim 7, wherein the asset comprises merchandise at a store.

11. The biometric exit system of claim 7, wherein the processing unit communicates with a payment system prior to signaling the physical exit control mechanism.

12. The biometric exit system of claim 7, wherein the processing unit accesses an identification of the asset.

13. The biometric exit system of claim 7, wherein the processing unit signals the physical exit control mechanism to prevent the person from exiting with the asset when the permissions indicate the person is unauthorized.

14. The biometric exit system of claim 7, wherein the physical exit control mechanism comprises a gate.

15. A biometric exit system, comprising:
    a non-transitory storage medium that stores instructions;
    an exit control mechanism comprising a physical barrier operable to prevent exit; and a processing unit that executes the instructions to:
  obtain an identification for a person at an exit with an asset using a digital representation of a biometric;
  identify the asset;
  when the person has permission to exit with the asset, allow the person to exit by signaling a physical exit control mechanism that is operable to prevent exit to allow the person to exit;
  use the identification to access stored preferences for the person;
  upon determining that the stored preferences indicate to automatically accept at least one offer on exit, automatically accept the at least one offer that is specified in the stored preferences when the person exits with the asset; and
  upon determining that the stored preferences do not indicate to automatically accept the at least one offer on exit, after the person exits with the asset, transmit a message that includes the at least one offer.

16. The biometric exit system of claim 15, wherein the processing unit is operable to receive a response to the message.

17. The biometric exit system of claim 16, wherein the response includes an acceptance of the at least one offer.

18. The biometric exit system of claim 15, wherein the at least one offer includes a purchase offer related to the asset.

19. The biometric exit system of claim 15, wherein the asset comprises a rental vehicle.

20. The biometric exit system of claim 15, wherein the at least one offer comprises an offer to upgrade a rental contract.

* * * * *